US012595682B2

(12) United States Patent
Fraser

(10) Patent No.: US 12,595,682 B2
(45) Date of Patent: Apr. 7, 2026

(54) BORING AND ROUTING TEMPLATE JIG FOR DOOR HARDWARE INSTALLATION

(71) Applicant: Garth Fraser, Panania (AU)

(72) Inventor: Garth Fraser, Panania (AU)

( * ) Notice: Subject to any disclaimer, the term of this patent is extended or adjusted under 35 U.S.C. 154(b) by 514 days.

(21) Appl. No.: 18/007,031

(22) PCT Filed: Aug. 2, 2021

(86) PCT No.: PCT/AU2021/050840
§ 371 (c)(1),
(2) Date: Jan. 26, 2023

(87) PCT Pub. No.: WO2022/027089
PCT Pub. Date: Feb. 10, 2022

(65) Prior Publication Data
US 2023/0287706 A1 Sep. 14, 2023

(30) Foreign Application Priority Data
Aug. 3, 2020 (AU) ................................ 2020902711

(51) Int. Cl.
*E05B 17/06* (2006.01)
*B23B 47/28* (2006.01)
*B27F 5/12* (2006.01)

(52) U.S. Cl.
CPC ............ *E05B 17/06* (2013.01); *B23B 47/287* (2013.01); *B27F 5/12* (2013.01); *B23B 2247/06* (2013.01)

(58) Field of Classification Search
CPC ... E05D 11/0009; E05B 17/06; B23B 47/287; B23B 2247/06; B23B 2247/12; B27F 5/12
See application file for complete search history.

(56) References Cited

U.S. PATENT DOCUMENTS 1,326,583 A * 12/1919 Catalantto ........... E05D 11/0009
33/197
1,679,074 A * 7/1928 Carter ....................... B27F 5/12
144/144.1
(Continued)

FOREIGN PATENT DOCUMENTS

FR 2645576 A1 * 10/1990 ............. E05B 17/06
GB 2238749 A * 6/1991 ................ B27F 5/12
(Continued)

OTHER PUBLICATIONS

International Preliminary Report on Patentability dated Jun. 28, 2022 from PCT Application No. PCT/AU2021/050840.
(Continued)

*Primary Examiner* — Jennifer H Gay
(74) *Attorney, Agent, or Firm* — INNOVATION CAPITAL LAW GROUP, LLP; Vic Lin

(57) ABSTRACT

A boring and routing template jig for door hardware installation has a side template plate, clamping for holding the side template plate against a side area of a door to be cut and a face template plate orthogonally connected against an edge of the side template plate by a connection so that the face template plate can lie across an edge face area of the door to be cut adjacent the side area. The face template plate and the side template plate comprise respective guide apertures. The connection is configured to maintain vertical offset between the respective guide apertures and allow horizontal offset adjustment between the face template plate and the side template plate.

18 Claims, 2 Drawing Sheets

(56)  References Cited

U.S. PATENT DOCUMENTS

| | | | | |
|---|---|---|---|---|
| 2,651,847 | A | * | 9/1953 | Sacrey ...................... B27F 5/12 |
| | | | | 33/197 |
| 3,392,607 | A | * | 7/1968 | Gieseke ................ B23B 47/287 |
| | | | | 144/144.51 |
| 4,306,823 | A | * | 12/1981 | Nashlund .............. B23B 47/287 |
| | | | | 33/197 |
| 4,553,336 | A | * | 11/1985 | Ponce ...................... B27F 5/12 |
| | | | | 33/562 |
| 5,114,285 | A | * | 5/1992 | Brydon ..................... B27F 5/12 |
| | | | | 408/241 B |
| 6,343,632 | B1 | * | 2/2002 | Zivojinovic .......... B23B 47/287 |
| | | | | 144/92 |
| 7,003,889 | B1 | * | 2/2006 | Luciani ................... E05B 17/06 |
| | | | | 33/562 |
| 2023/0287706 | A1 | * | 9/2023 | Fraser ..................... E05B 17/06 |

FOREIGN PATENT DOCUMENTS

| | | | | | |
|---|---|---|---|---|---|
| GB | 2525139 | A | * | 10/2015 | ......... E05D 11/0009 |
| JP | S5829402 | A | | 2/1983 | |
| JP | S5829402 | U | * | 2/1983 | |
| JP | H0270916 | U | * | 5/1990 | |
| WO | WO-8810177 | A1 | * | 12/1988 | ........... B25H 1/0078 |
| WO | WO-2021250112 | A1 | * | 12/2021 | ................ B27F 5/02 |

OTHER PUBLICATIONS

International Search Report & Written Opinion dated Nov. 10, 2021 from PCT Application No. PCT/AU2021/050840.

* cited by examiner

BORING AND ROUTING TEMPLATE JIG FOR DOOR HARDWARE INSTALLATION

FIELD OF THE INVENTION

The present invention relates generally to the field of hole routing and drilling templates and guides, and, more particularly, to hole routing and drilling templates and guides for correct positioning of holes for the installation of door handle and lock hardware.

BACKGROUND OF THE INVENTION

Builders, carpenters, homeowners and the like and the like are required to install door handle and lock hardware from time to time on original or new doors.

One of the hardest tasks of installing door hardware is correctly aligning perpendicular installation and mounting holes.

Many door hardware sets come with paper or cardboard templates which may be stuck to the door but which are cumbersome and do not eliminate misalignment.

A need therefore exists for a small and relatively expensive boring and routing template jig for door hardware which can greatly simplify the accurate and rapid installation of door hardware assemblies.

It is to be understood that, if any prior art information is referred to herein, such reference does not constitute an admission that the information forms part of the common general knowledge in the art, in Australia or any other country.

SUMMARY OF THE DISCLOSURE

There is provided herein a boring and routing template jig for door hardware installation comprising a side template plate, clamping for holding the side template plate against a side area of a door to be cut and a face template plate orthogonally connected against an edge of the side template plate by a connection so that the face template plate can lie across an edge face area of the door to be cut adjacent the side area. The face template plate and the side template plate comprise respective guide apertures for guiding routing or drilling.

The connection is configured to maintain vertical offset between the respective guide apertures and allow horizontal offset adjustment between the face template plate and the side template plate.

The connection may comprise the face template plate comprising horizontal parallel slots within which fasteners releasably engage an edge of the side template plate. As such, the side template plate can be positioned at various positions along a rear surface of the face template plate.

The connection may be accurately adjusted (including using provided horizontal offset markings) to accurately centre a guide aperture of the face template plate centrally with respect of the edge face area of the door to be cut whereafter the fasteners may be tightened to prevent further relative horizontal movement.

Thereafter, the configured jig may be quickly clamped to the side of the door wherein the face template plate accurately centrally positions the guide apertures for routing installation holes and the side template plate accurately vertically positions the guide apertures for drilling mounting holes with respect to the mounting holes of the face template plate.

The clamping may connect to the side template plate to avoid protrusions on the outer surface of the side template plate and, furthermore, the fasteners of the connection may be recessed so as to not protrude beyond a front surface of the front template plate, thereby leaving the plates free for smoothly running routing machinery there across.

The jig may comprise different types of face and side template plates for installation of different types of hardware and the jig may comprise markings indicating which guide apertures of the side template plate are to be used with the guide apertures of the front template plate for installation of particular types of hardware.

The front template plate may comprise to guide apertures for different types of hardware installation and wherein the front template plate can be flipped (i.e. by rotating the front template plate through 180°) with respect to the side template plate to employ one of the other of the guide template apertures.

The jig may comprise interconnections to allow for easy flatpack disassembly.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
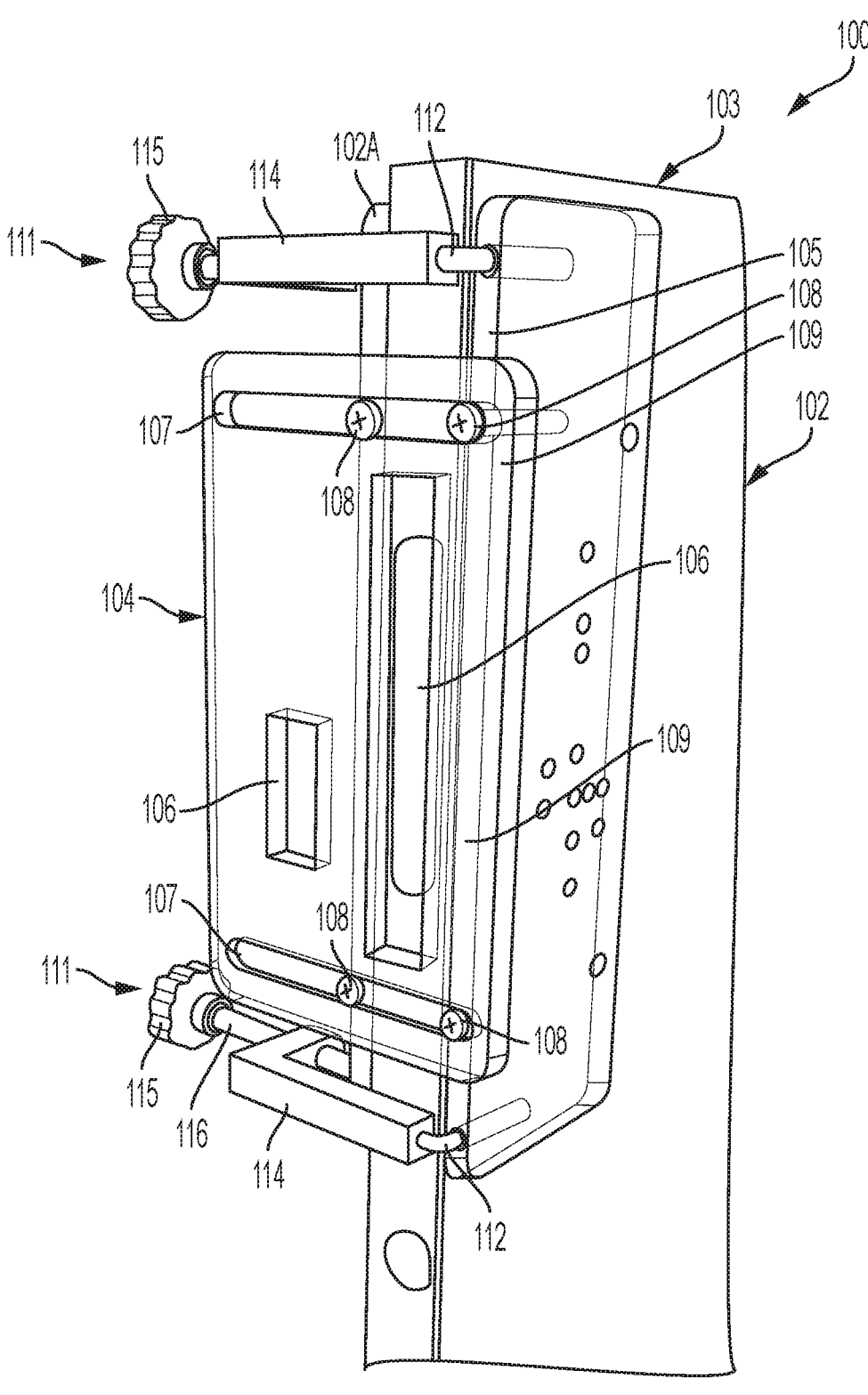
FIG. 1 shows a boring and routing template jig for door hardware installation attached to an edge of a door.

A template jig 100 comprises a side template plate 102, clamping for holding the side template plate 102 against a side area of a door 103 to be cut and a face template plate 104 orthogonally connected against an edge 105 of the side template plate 102 by a connection so that the face template plate 104 can lie across an edge face area of the door 103 to be cut adjacent the side area.

Figures 2, 3:
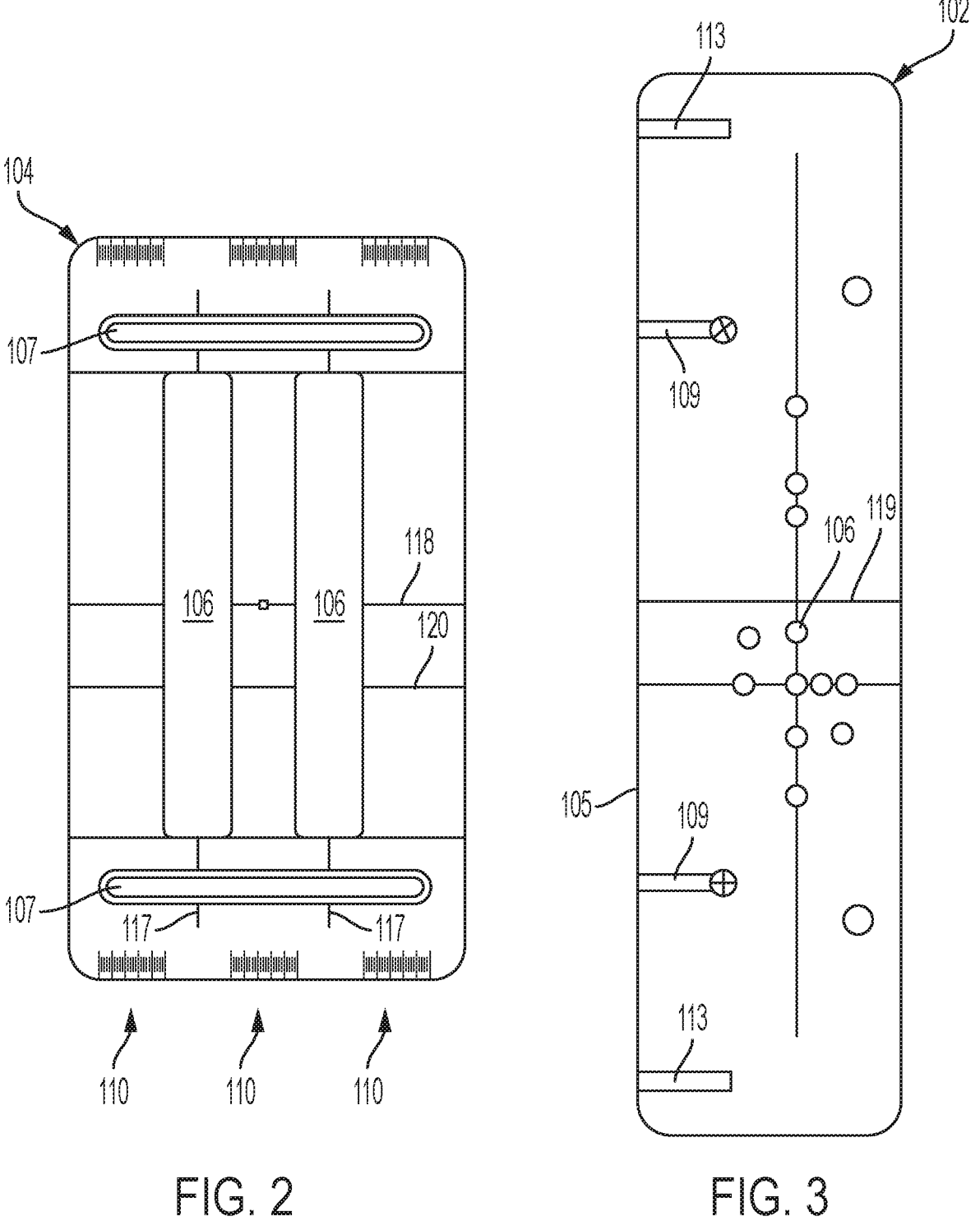
FIG. 2 shows a plan view of a front template plate of the jig in accordance with an embodiment.
FIG. 3 shows a plan view of a side template plate of the jig in accordance with an embodiment.

The face template plate 104 and the side template plate 102 comprise respective cutting guide apertures 106. With reference to FIGS. 2 and 3, the cutting guide apertures 103 may be large and rectangular or circular for routing with an inverted bearing router, circular drill bit or the like for the making of installation holes or relatively smaller and circular for drilling with a drill bit for the making of mounting holes.

The connection between the edge 105 of the side template plate 102 and the face template plate 104 maintains vertical offset between the respective guide apertures 106 of the side template plate 102 and the face template plate 104 but allows horizontal offset adjustment between the face template plate and the side template plate.

The connection may allow connection of the edge 105 of the side template plate 102 against a rear surface of the face template plate 104 at various positions across the rear surface.

In the embodiment shown, the face template plate 104 is rectangular and the side template plate 102 is rectangular and the connection connects a long edge 105 of the side template plate 102 along a length of the face template plate 104.

The connection may comprise the face template plate 104 comprising a parallel pair of channels 107 and the edge 105 of the side template plate 102 having respective fasteners 108 engaging the channels 107. The fasteners 108 can be released to allow horizontal offset adjustment and tightened to maintain horizontal offset between the face template plate 104 underside template plate 102.

In the embodiment shown, the fasteners 108 comprise screws which screw into threaded blind holes 109 in the edge 105 of the side template plate 102.

The channels 107 may be countersunk so that the fasteners 108 are recessed so as not to protrude above the front surface of the face template plate 104.

Whereas FIG. 3 shows the side template plate 102 comprising a single pair of blind holes 109 for the fasteners 108, as is illustrated in FIG. 1, the edge 105 of the side template plate may comprise a further pair of inner blind holes to accommodate smaller sized face template plates 104.

The face template plate 104 may comprise horizontal offset markings 110. The horizontal offset markings 110 may be located at an outer edge of the face template plate 104 as is shown in FIG. 2 for alignment with at least one of an edge of the door 103 and the side template plate 102.

The face template plate 104 may be transparent so that the relative positioning of the door or the side template plate 102 can be seen through the face template plate 104 with respect to the horizontal offset markings 110.

As is shown in FIGS. 1 and 2, the horizontal offset markings 110 may be divided into groups to align with either side of the door 103. Specifically, the horizontal offset markings 110 may comprise a central group of markings and a side group of markings. In embodiments, the face template plate 104 may be flipped to install different door hardware and wherein the horizontal offset markings 110 comprise two side groups of markings for alignment irrespective of the orientation of the face template plate 104.

The clamping may comprise two clamps 111 which engage the side template plate 102 either side of the face template plate 104 therebetween.

Each clamp 111 may comprise an orthogonal rod 112 which goes into a respective blind hole 113 of the edge 105 of the side template plate 102.

Each clamp 111 may comprise an arm 114 connecting the rod 112 to make a C-shape and wherein a distal end of the arm 114 comprises a screw 116 therethrough having a movable jaw acting in opposition to the side template plate 102. Each clamp 111 may comprise an accessible thumbscrew 115 for turning the screw 116.

The face template plate 104 may comprise two guide apertures 106 for different types of door hardware. As is shown in FIG. 1, the face template plate 104 may comprise a relatively larger guide aperture 106 for a first type of door hardware and a relatively smaller guide aperture 106 for a different type of door hardware.

These apertures 106 may be located either side of a longitudinal midline of the face template plate 104 so that the face template plate 104 can be flipped to install either type of respective hardware.

With reference to FIG. 2, the face template plate 104 may comprise longitudinal centreline markings 117 indicating the centreline of respective guide apertures 106.

As is also shown in FIG. 2, the face template plate 104 may have a horizontal centreline marking 118 vertically centred with respect to a respective guide aperture 106. As such, a centreline may be marked on the door 103 in pencil whereafter the jig 100 may be installed so that the horizontal centreline 118 aligns with the marked centreline of the door.

The side template plate 102 may have a corresponding horizontal centreline marking 119 corresponding in vertical position with the centreline marking 118 of the face template plate 104 when the face template plate 104 is orthogonally connected against the edge 105 of the side template plate 102 by the connection.

The side template plate 102 may also comprise different types of guide apertures 106 for different types of door hardware.

Whereas different types of face template plates 104 and template plates 102 may be interchanged for various types of door hardware installation, the face template plate 104 may have an indication 120 corresponding in vertical position with one of the guide apertures 106 of the side template plate 102 when the face template plate 104 is orthogonally connected against the edge 105 of the side template plate 102 to indicate which guide aperture 106 of the side template plate 102 to use.

For example, where the guide aperture 106 of the face template plate 104 is for a particular type of mortise lock, the indications 120 may indicate the corresponding guide apertures 106 of the side template plate 102 drilling of screw holes therefor.

In the embodiment shown in FIG. 1, the jig 100 may comprise a further side template plate 102A having guide apertures 106 corresponding with those of the side template plate 102. As such, the door 103 may be cut from either side using either the side template plate 102 or the further side template plate 102A.

The further side template plate 102A may be connected to the face template plate 104 using the same connection. Specifically, the further side template plate 102A may have respective fasteners 108 engaging the same channels 107 of the face template plate 104.

The clamps 111 may bear against the further side template plate 102A to avoid excessive force on the connection.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A boring and routing template jig for door hardware installation, the jig comprising:
   a side template plate;
   clamping for the side template plate; and
   a face template plate connected orthogonally across an edge of the side plate by a connection which:

maintains vertical offset between the side template plate and the face template plate; and allows horizontal offset adjustment of the face template plate with respect to the side template plate whilst the side template plate is clamped by the clamp against a side of a door in use;

wherein the clamping comprises two clamps which engage the side template plate either side of the face template plate;

wherein each clamp comprises a rod which inserts into a respective blind hole of the edge of the side template plate.

2. The jig as claimed in claim 1, wherein the connection allows connection of the edge of the side template plate against a rear surface of the face template plate at various positions across the rear surface.

3. The jig as claimed in claim 1, wherein the face template plate is rectangular and the side template plate is rectangular and wherein the connection connects a long edge of the side template plate along a length of the face template plate.

4. The jig as claimed in claim 1, wherein the connection is formed between a parallel pair of channels of the face template plate and respective fasteners therethrough engaging the edge of the side template plate.

5. The jig as claimed in claim 4, wherein the fasteners are recessed so as to not protrude above a front surface of the face template plate.

6. The jig as claimed in claim 4, wherein the fasteners engage in respective blind holes in the edge of the side template plate.

7. The jig as claimed in claim 4, wherein the edge of the side template plate comprises an outer pair of corresponding blind holes and an inner pair of corresponding blind holes.

8. The jig as claimed in claim 1, wherein the face template plate has horizontal offset markings.

9. The jig as claimed in claim 8, wherein the face template plate is transparent so that the relative positioning of at least one of the side template plate and side of the door can be seen through the face template plate with respect to the horizontal offset markings.

10. The jig as claimed in claim 8, wherein the horizontal offset markings comprise a central group of markings and a side group of markings.

11. The jig as claimed in claim 1, wherein each clamp has an arm connecting the rod, the arm and the rod forming a C-shape and a screw through a distal end of the arm having a moveable jaw acting in opposition to the side template plate.

12. The jig as claimed in claim 1, wherein the face template plate has two guide apertures for different types of door hardware.

13. The jig as claimed in claim 12, wherein the two guide apertures are located either side of a vertical midline therebetween and wherein the connection allows the face template plate to be connected to the side template plate in either of two orientations 180° apart to employ either of the two guide apertures against the edge face area.

14. The jig as claimed in claim 1, wherein the face template plate has a horizontal centreline marking vertically centered with respect to a guide aperture thereof.

15. The jig as claimed in claim 14, wherein the side template plate has a corresponding horizontal centreline marking corresponding in vertical position with the centreline marking of the face template plate when the face template plate is orthogonally connected against the edge of the side template plate by the connection.

16. The jig as claimed in claim 1, wherein the side template plate has two guide apertures for different types of door hardware.

17. The jig as claimed in claim 16, wherein the face template plate has an indication corresponding in vertical position with one of the guide apertures of the side template plate when the face template plate is orthogonally connected against an edge of the side template plate by the connection.

18. The jig as claimed in claim 1, further comprising a further side template plate having guide apertures corresponding with those of the side template plate and wherein the face template plate is also orthogonally connected across an edge of the further side template plate.

* * * * *